United States Patent
Nanjo

(10) Patent No.: US 11,125,949 B2
(45) Date of Patent: Sep. 21, 2021

(54) OPTICAL CONNECTOR AND METHOD FOR MANUFACTURING OPTICAL CONNECTOR

(71) Applicant: Sumitomo Electric Industries, Ltd., Osaka (JP)

(72) Inventor: Takuya Nanjo, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/814,113

(22) Filed: Mar. 10, 2020

(65) Prior Publication Data
US 2020/0209486 A1 Jul. 2, 2020

Related U.S. Application Data

(63) Continuation of application No. PCT/JP2017/043971, filed on Dec. 7, 2017.

(30) Foreign Application Priority Data

Sep. 20, 2017 (JP) .............................. JP2017-180481

(51) Int. Cl.
 *G02B 6/36* (2006.01)
 *G02B 6/42* (2006.01)
 *G02B 6/44* (2006.01)

(52) U.S. Cl.
 CPC ........... *G02B 6/3612* (2013.01); *G02B 6/424* (2013.01); *G02B 6/448* (2013.01)

(58) Field of Classification Search
 CPC ........ G02B 6/28; G02B 6/02042; G02B 6/30; G02B 6/3612; G02B 6/3636; G02B 6/424;
(Continued)

(56) References Cited

U.S. PATENT DOCUMENTS 6,295,400 B1 9/2001 Shahid
2004/0063237 A1* 4/2004 Yun ..................... B81C 1/00357
438/48
(Continued)

FOREIGN PATENT DOCUMENTS

JP H07-301715 A 11/1995
JP H10-339818 A 12/1998
(Continued)

OTHER PUBLICATIONS

International Search Report issued in Patent Application No. PCT/JP2017/043971 dated Jan. 16, 2018.

*Primary Examiner* — Michael P Mooney
(74) *Attorney, Agent, or Firm* — Pearne & Gordon LLP

(57) ABSTRACT

An optical connecting component configures to be mounted onto an optical component includes a plurality of optical fibers and terminal components disposed at the ends of the plurality of optical fibers. The optical fibers are arranged side by side and integrated together in a state in which the optical fibers can be separated from one another. A method of manufacturing an optical connecting component that includes a plurality of optical fibers and a terminal component disposed at ends of the plurality of optical fibers and that is mounted onto an optical component includes a step of arranging the plurality of optical fibers side by side and integrating the plurality of optical fibers together, a step of connecting end portions of the plurality of optical fibers to the terminal component, and a step of separating the plurality of optical fibers from one another.

6 Claims, 6 Drawing Sheets

(58) Field of Classification Search
CPC ...... G02B 6/4246; G02B 6/4292; G02B 6/43; G02B 6/4403
USPC .............................. 385/24, 49, 74–92, 114
See application file for complete search history.

(56) References Cited

U.S. PATENT DOCUMENTS

| | | | |
|---|---|---|---|
| 2005/0271342 A1* | 12/2005 | Tanaka | G02B 6/4472 385/134 |
| 2013/0272664 A1 | 10/2013 | Arao et al. | |
| 2015/0192749 A1* | 7/2015 | Homma | G02B 6/4432 385/103 |
| 2018/0156987 A1 | 6/2018 | Nakanishi et al. | |

FOREIGN PATENT DOCUMENTS

| | | |
|---|---|---|
| JP | 2001-013330 A | 1/2001 |
| JP | 2003-315591 A | 11/2003 |
| JP | 2005-114830 A | 4/2005 |
| JP | 2005-316246 A | 11/2005 |
| JP | 2005-536774 A | 12/2005 |
| JP | 2013-221968 A | 10/2013 |
| WO | 2017/022085 A1 | 2/2017 |

* cited by examiner ical fibers may be 100 μm or less, and a coating diameter
OPTICAL CONNECTOR AND METHOD FOR MANUFACTURING OPTICAL CONNECTOR

CROSS-REFERENCE TO RELATED APPLICATION

This is a continuation application of PCT/JP2017/043971 claiming the benefit of the Japanese Patent Application No. 2017-180481 filed on Sep. 20, 2017, which is incorporated by reference herein in its entirety.

BACKGROUND OF THE INVENTION

Technical Field

The present invention relates to an optical connecting component that includes a plurality of optical fibers and terminal components such as a fiber array and an optical connector disposed at ends of the optical fibers and that is mounted on an optical component, such as an optical transceiver or an optical receiver, and a method of manufacturing the optical connecting component.

Background Art

An optical connecting component includes optical fibers therein and is used for, for example, optically connecting an electronic substrate and an internal optical wiring line of a device (or an external optical transmission line). In recent years, optical components (e.g., optical transceivers) have been formed to be small and to be capable of performing bulk data transmission, and an optical connecting component that is mounted onto such an optical component uses an optical-fiber ribbon that is formed by coating and integrating a plurality of optical fibers together. For example, International Publication No. 2017/022085 discloses a structure of an optical connecting component that uses an optical-fiber ribbon having eight fibers. In this optical connecting component, terminal components such as, for example, a fiber array and an optical connector are disposed at the ends of a plurality of optical fibers.

SUMMARY OF INVENTION

It is an object of the present invention to provide an optical connecting component including an optical fiber that can be flexibly arranged and a method of manufacturing the optical connecting component.

According to a first aspect of the present invention, a method of manufacturing an optical connecting component that includes a plurality of optical fibers and a terminal component disposed at ends of the plurality of optical fibers and that is mounted onto an optical component includes a step of arranging the plurality of optical fibers side by side and integrating the plurality of optical fibers together, a step of connecting end portions of the plurality of optical fibers to the terminal component, and a step of separating the plurality of optical fibers from one another. The terminal component is a fiber array that is attached to an optical component, which is, for example, an optical waveguide substrate, or an optical connector that is connected to an MT connector.

In the manufacturing method according to the first aspect of the present invention, a glass diameter of each of the optical fibers may be 100 μm or less, and a coating diameter that is an outermost diameter of each of the optical fibers may be 240 μm or more and 260 μm or less. The step of integrating may include attaching a releasable tape that has an adhesive whose adhesive strength deteriorates by being irradiated with ultraviolet light to the plurality of optical fibers. The step of integrating may include integrating the plurality of optical fibers together by using a ribbon coating, and the step of separating may include applying friction to a surface of the ribbon coating such that a crack is generated in the ribbon coating between the optical fibers.

According to a second aspect of the present invention, a method of manufacturing an optical connecting component that includes a plurality of optical fibers and a terminal component disposed at ends of the plurality of optical fibers and that is mounted onto an optical component includes a step of connecting end portions of the plurality of optical fibers, the plurality of optical fibers being arranged side by side and integrated together by using a ribbon coating, to the terminal component and a step of separating the plurality of optical fibers from one another by applying friction to a surface of the ribbon coating such that a crack is generated in the ribbon coating between the optical fibers.

An optical connecting component according to the present invention is configured to be mounted onto an optical component and includes a plurality of optical fibers and a terminal component disposed at ends of the plurality of optical fibers, and the optical fibers are arranged side by side and integrated together in a state in which the optical fibers can be separated from one another.

According to the present invention, a plurality of optical fibers can be easily connected to a terminal component so as to form an optical connecting component, and the optical connecting component can be easily mounted onto an optical component.

DESCRIPTION OF EMBODIMENTS

An optical connecting component and a method of manufacturing an optical connecting component according to preferred embodiments of the present invention will be described below with reference to the accompanying drawings.

Figure 1:
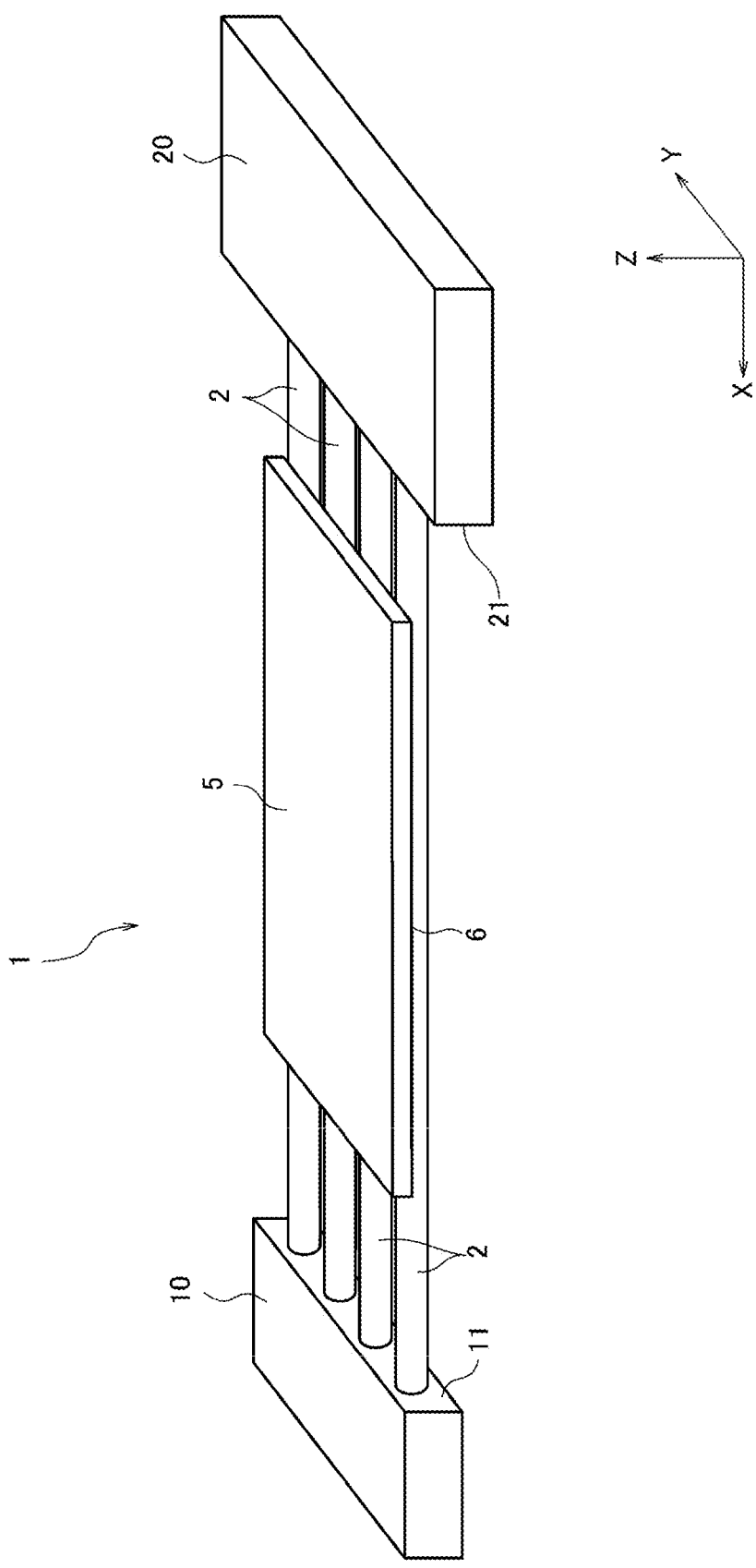
FIG. 1 is a perspective view illustrating an optical connecting component according to a first embodiment of the present invention.

A terminal component is fixed to an optical component while being connected to optical fibers. Thus, it is desirable that optical fibers of an optical connecting component can be flexibly arranged. FIG. 1 is a perspective view illustrating an optical connecting component 1 according to a first embodiment of the present invention. The optical connecting component 1 includes, for example, four optical fibers 2 that are arranged side-by-side and parallel to the X-axis in FIG. 1, a fiber array 10, an optical connector 20, and a UV releasable tape 5.

For example, each of the optical fibers 2 is formed by coating the outer peripheral surface of a so-called primary-coated fiber with a colored coating, the so-called primary-coated fiber being formed by providing a coating on a glass fiber having a standard outer diameter of 125 µm such that the coating has an outer diameter of about 250 µm. However, each of the optical fibers 2 is not limited to this, and the flexibility of each of the optical fibers 2 can be further improved by using a small-diameter glass fiber having an outer diameter of less than 100 µm. In addition, in this case, by setting the outer diameter of the coating to 250 µm as in the conventional art, connection and mounting operations can be performed in the same manner as the conventional art. For example, if an optical fiber has a glass outer diameter of 80 µm and a coating outer diameter of 250 µm, the flexibility of the optical fiber is improved, and in addition, a manufacturing operation in the conventional art is compatible with this optical fiber and can be performed without making any particular change. Furthermore, the number of the optical fibers can be an arbitrarily selected number, such as eight or sixteen.

For example, each of the optical fibers 2 has a fiber length of about 10 mm to about 40 mm, which is short, and extends in the X-axis direction in FIG. 1. First ends of the optical fibers 2 are inserted into an end surface 11 of the fiber array 10 and fixed to the fiber array 10. Second ends of the optical fibers 2 are inserted into an end surface 21 of the optical connector 20 and connected to the optical connector (e.g., an MT ferrule) 20.

The UV releasable tape 5 is, for example, SELFA-SE (manufactured by Sekisui Chemical Co., Ltd., also called a UV tape) and is formed in, for example, a rectangular shape having a width capable of covering the four optical fibers 2 from above. One surface (an attachment surface 6) of the UV releasable tape 5 has an adhesive applied thereto, and the adhesive strength of the adhesive deteriorates by being irradiated with ultraviolet (UV) light.

Before the optical fibers 2 are attached to the fiber array 10 or before the optical fibers 2 are connected to the optical connector 20, the UV releasable tape 5 is attached to the optical fibers 2, which have been arranged side-by-side. As a result, the arranged optical fibers 2 can be maintained in an integrated state like an optical-fiber ribbon, and thus, the ends of the optical fibers 2 can be aligned in, for example, the Y-axis direction in FIG. 1, and the optical fibers 2 can be easily connected to the fiber array 10 and the optical connector 20.

On the other hand, after the optical fibers 2 have been attached to the fiber array 10 or after the optical fibers 2 have been connected to the optical connector 20, the UV releasable tape 5 is irradiated with UV light. In this case, the adhesive strength of the adhesive rapidly deteriorates, and this enables the optical fibers 2 to be easily separated from one another. By separating the optical fibers 2 from one another, the flexibility of each of the optical fibers 2 increases, and thus, the fiber array 10 and the optical connector 20 can be easily connected to the optical component. Thus, the load that is applied to the fiber array 10 and the optical connector 20 is reduced, and breakage of the fiber array 10 and the optical connector 20 can be prevented. As a result, the long-life optical connecting component 1 can be provided.

Figure 7:
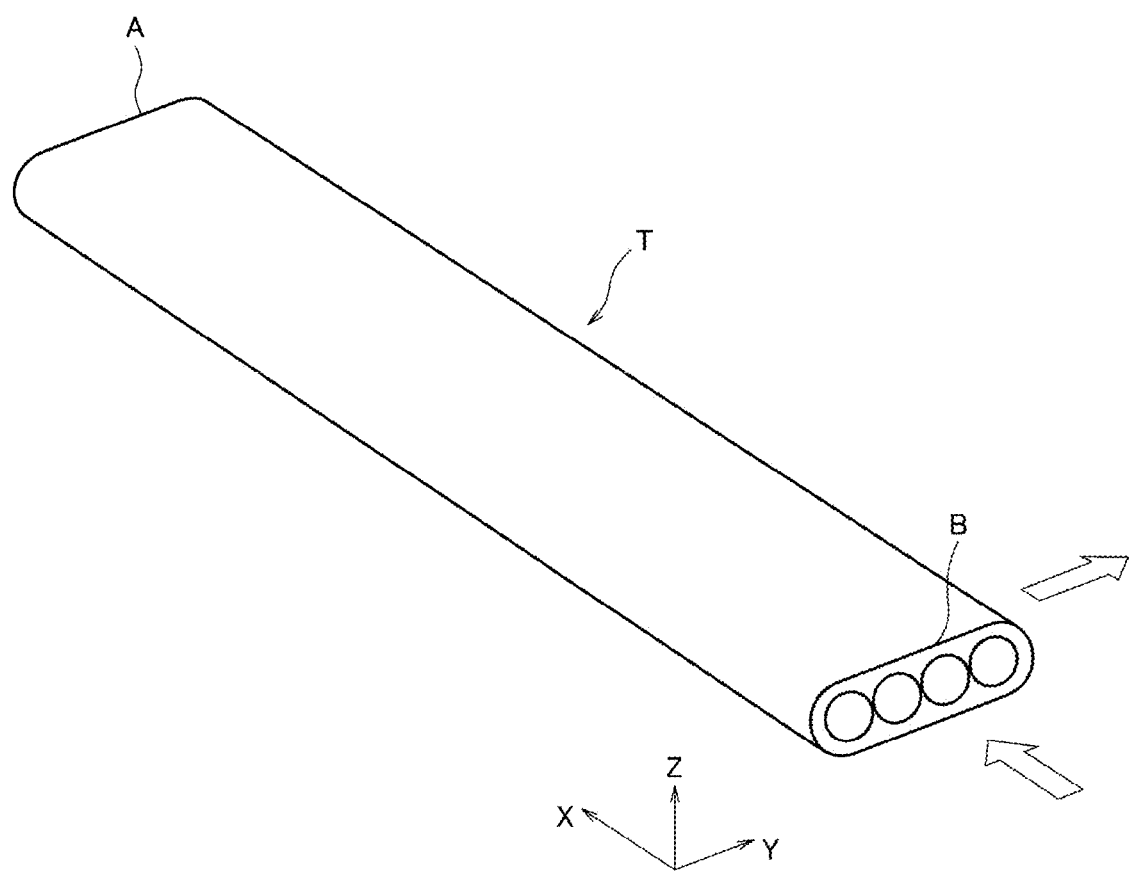
FIG. 7 is a diagram illustrating a flexibility evaluation model.

Note that, regarding the reaction force that is generated as a result of displacement of the optical fibers, when the optical fibers are separated from one another, the reaction force is smaller than that when the optical fibers are integrated with one another, and the flexibility and the elasticity of the optical fibers increase. A case in which four optical fibers each having a glass fiber diameter of 125 µm, a coating outer diameter of 250 µm, and a fiber length of 30 mm are integrated with one another by using a common coating (having a height of 0.3 mm and a width of 1.1 mm) so as to form an optical fiber ribbon T (FIG. 7) and a case in which these optical fibers are not integrated with one another will be described below.

When first ends A of the optical fibers (the optical-fiber ribbon T in the case where the optical fibers were integrated with one another) were fixed in place, and second ends B of the optical fibers were displaced by 1 mm in the longitudinal direction (the X direction), the reaction force generated in the optical fibers was 0.58 N when the optical fibers were separated from one another and was 0.78 N when the optical fibers were integrated with one another. When the first ends A of the optical fibers (the optical-fiber ribbon T in the case where the optical fibers were integrated with one another) were fixed in place, and the second ends B of the optical fibers were displaced by 1 mm in a direction (the Y direction) crossing the longitudinal direction of the optical fibers, the reaction force generated in the optical fibers was 0.10 N when the optical fibers were separated from one another and was 0.20 N when the optical fibers were integrated with one another.

Figure 2A:
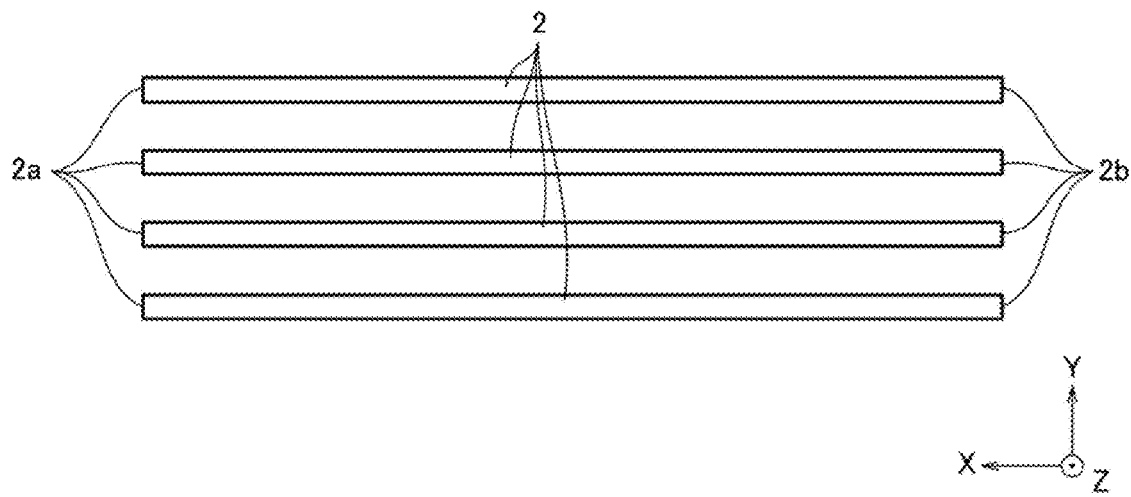
FIG. 2A, FIG. 2B, and FIG. 2C are diagrams illustrating a step of arranging a plurality of optical fibers side by side and integrating the optical fibers with one another in a method of manufacturing the optical connecting component illustrated in FIG. 1.
Figure 2B:
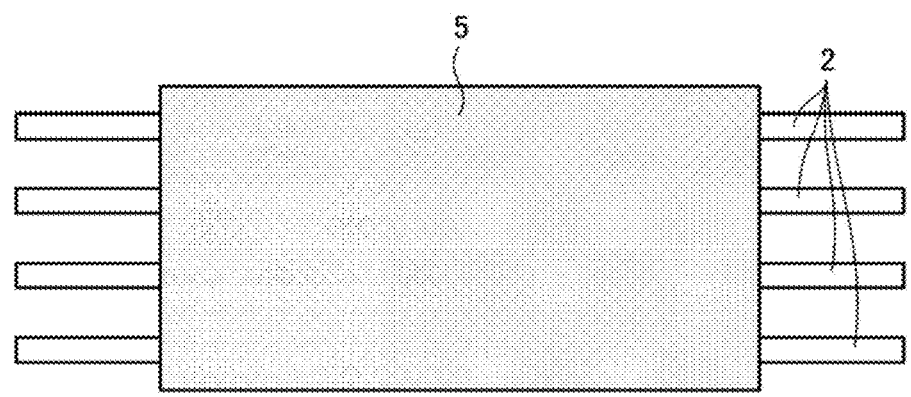
Figure 2C:
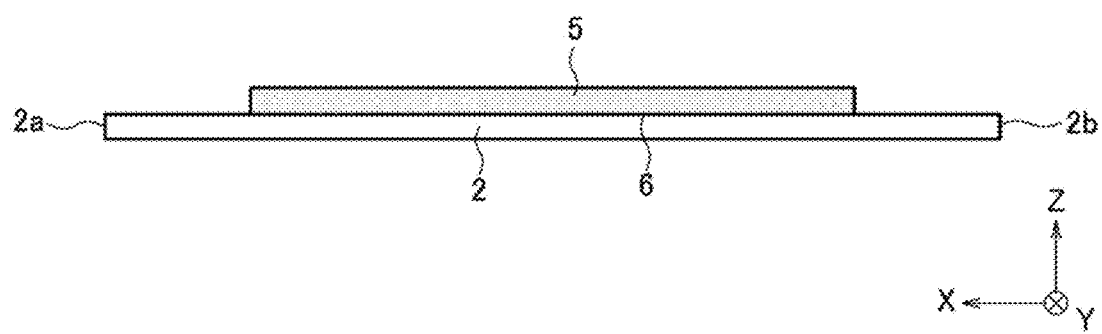

FIG. 2A, FIG. 2B, FIG. 2C, FIG. 3, FIG. 4A, and FIG. 4B are diagrams illustrating a method of manufacturing the optical connecting component 1. In the method of manufacturing the optical connecting component 1, first, the four optical fibers 2 are arranged side by side (FIG. 2A), and the attachment surface 6 of the UV releasable tape 5 is attached to the arranged optical fibers 2 such that the optical fibers 2 are temporarily fixed to the UV releasable tape 5 (FIG. 2B and FIG. 2C).

Figure 3:
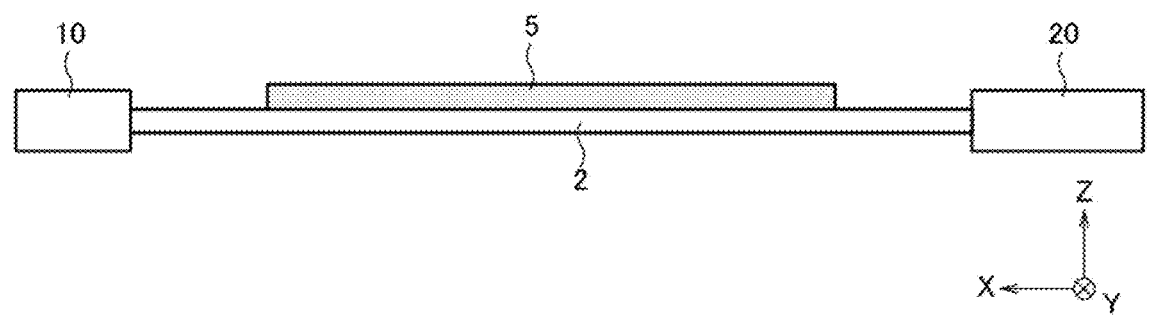
FIG. 3 is a diagram illustrating a step of connecting the plurality of optical fibers to a terminal component in the method of manufacturing the optical connecting component illustrated in FIG. 1.

Subsequently, the optical fibers 2, which have been temporarily fixed in place by the UV releasable tape 5, are attached to the fiber array 10 (FIG. 3). In this case, first ends 2a of the optical fibers 2 are aligned in the Y direction, and thus, the optical fibers 2 can be easily connected to the fiber array 10. In addition, the optical fibers 2 are connected to the optical connector 20 (FIG. 3). Also in this case, second ends 2b of the optical fibers 2 are aligned in the Y direction, and thus, the optical fibers 2 can be easily connected to the optical connector 20.

Figure 4A:
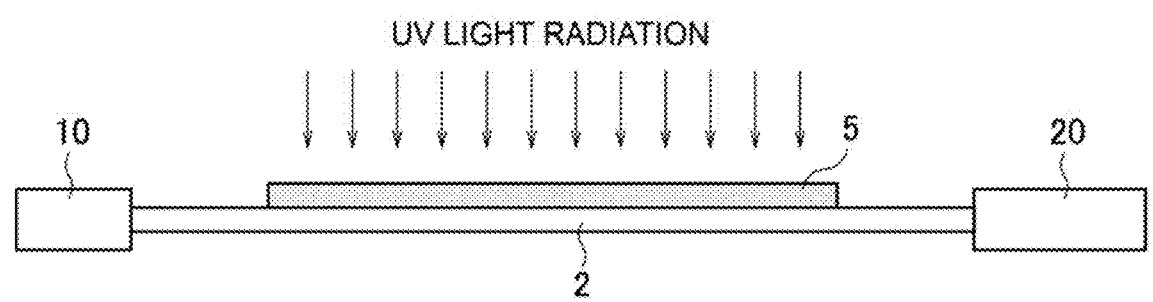
FIG. 4A and FIG. 4B are diagrams illustrating a step of separating the plurality of optical fibers from one another in the method of manufacturing the optical connecting component illustrated in FIG. 1.
Figure 4B:
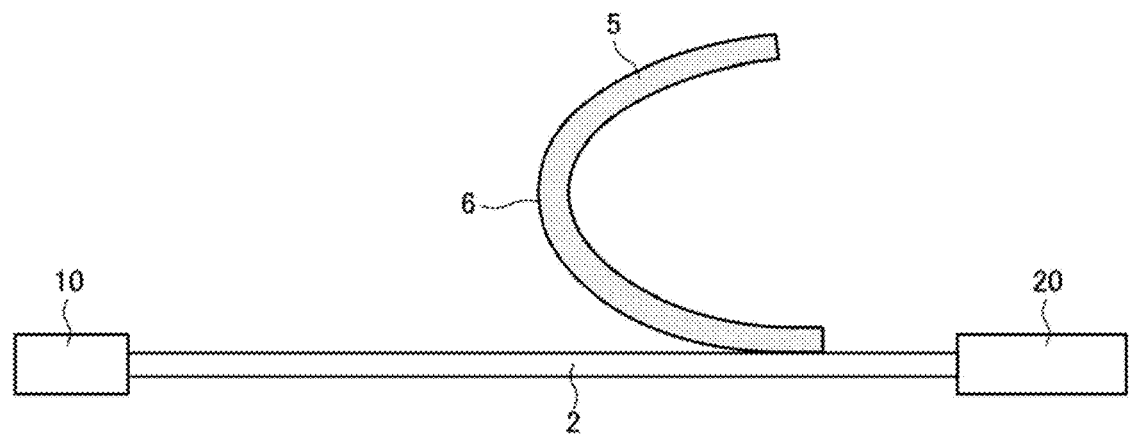

Next, when UV light is radiated onto the UV releasable tape 5 (FIG. 4A), the attachment surface 6 can be separated from the optical fibers 2 with a force of, for example, 0.5 N or less (FIG. 4B). As a result, the optical fibers 2 can be separated from one another.

Figure 5A:
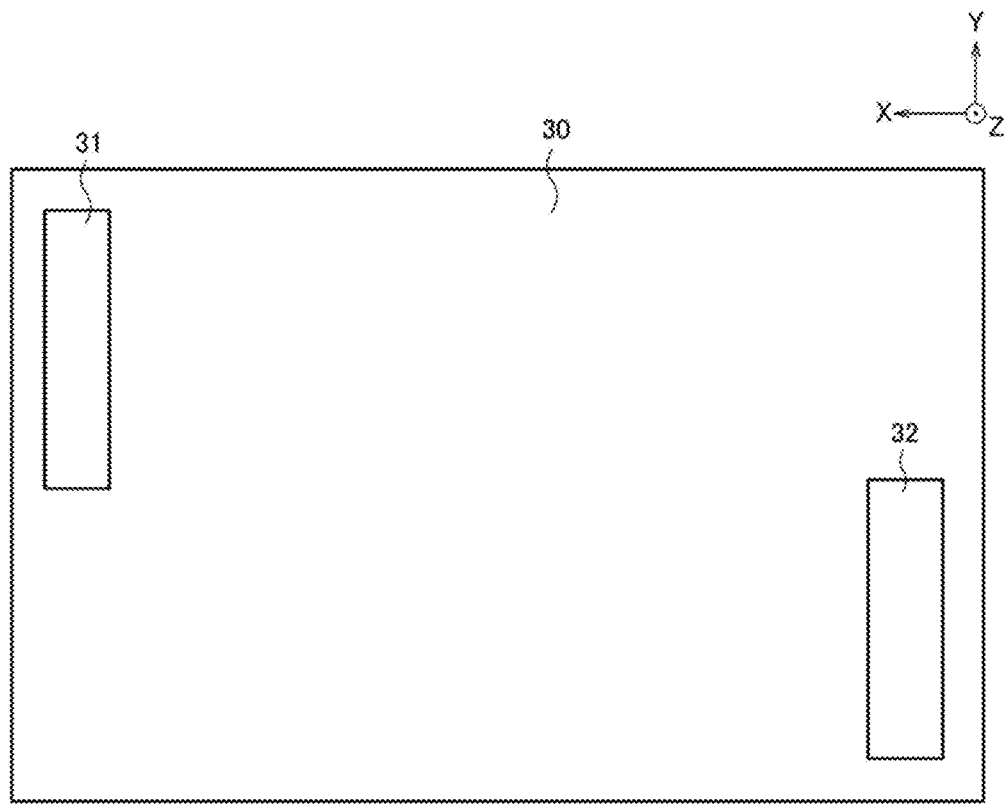
FIG. 5A and FIG. 5B are diagrams illustrating a case of mounting the optical connecting component according to the present invention onto an optical component.
Figure 5B:
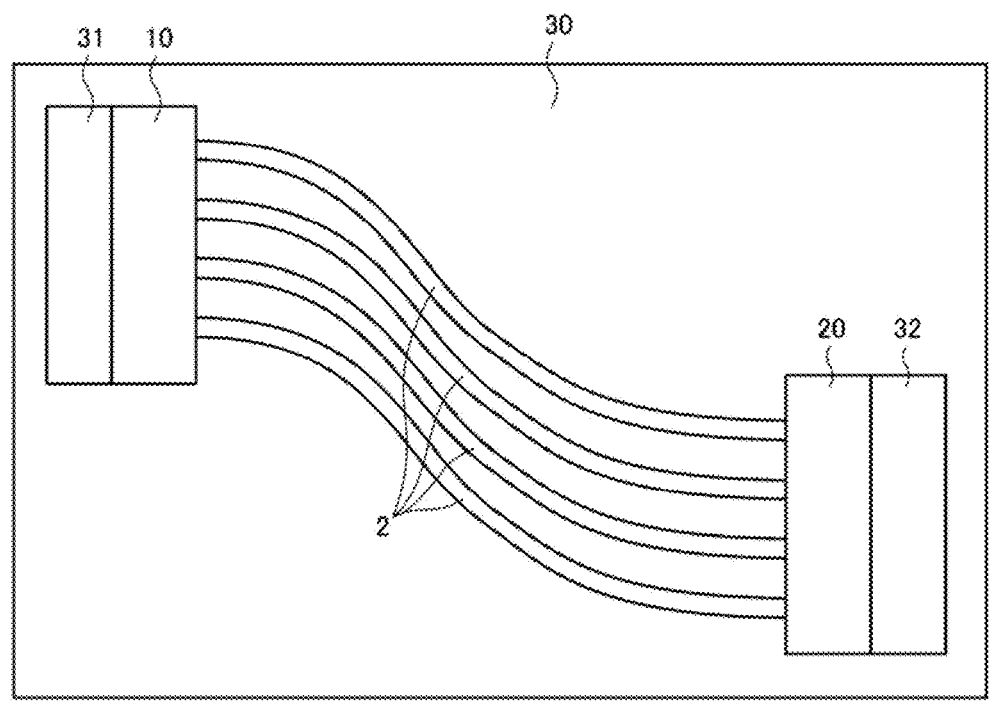

FIG. 5A and FIG. 5B are diagrams illustrating a case of mounting the optical connecting component according to the present invention onto an optical component. After the UV releasable tape 5 has been separated from the optical fibers 2, the optical connecting component 1 is mounted onto an optical component 30 that is illustrated in FIG. 5A. More specifically, the fiber array 10 is coupled to a connector 31 of the optical component 30 while being connected to the optical fibers 2 that have been separated from one another (FIG. 5B) and is connected to, for example, a waveguide substrate. The optical connector 20 is connected to a connector (an MT ferrule) 32 of the optical component 30 while being connected to the optical fibers 2 that have been separated from one another (FIG. 5B).

As described above, the optical fibers 2 can be flexibly arranged. In other words, the optical fibers 2 can be easily connected to the fiber array 10 and the optical connector 20 as a result of being integrated with one another by the adhesive strength before UV light radiation, and after the adhesive strength has deteriorated as a result of the UV light radiation, the optical fibers 2 are separated from one another, so that the fiber array 10 and the optical connector 20 that have been attached to the optical fibers 2, which have been separated from one another, can be easily connected to the optical component 30. In addition, the required dimensional accuracy of the fiber array 10 and the required dimensional accuracy of the optical connector 20 can be reduced, and the optical connecting component 1 that can be easily manufactured can be provided.

Figure 6A:
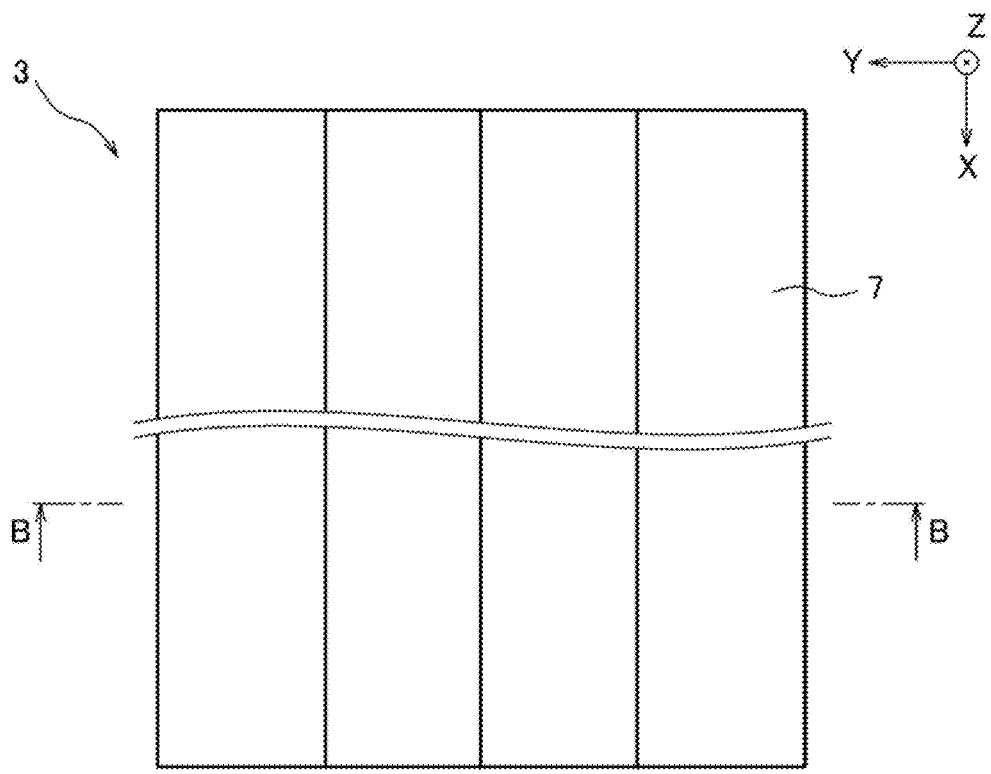
FIG. 6A and FIG. 6B are diagrams illustrating an optical connecting component according to a second embodiment of the present invention.
Figure 6B:
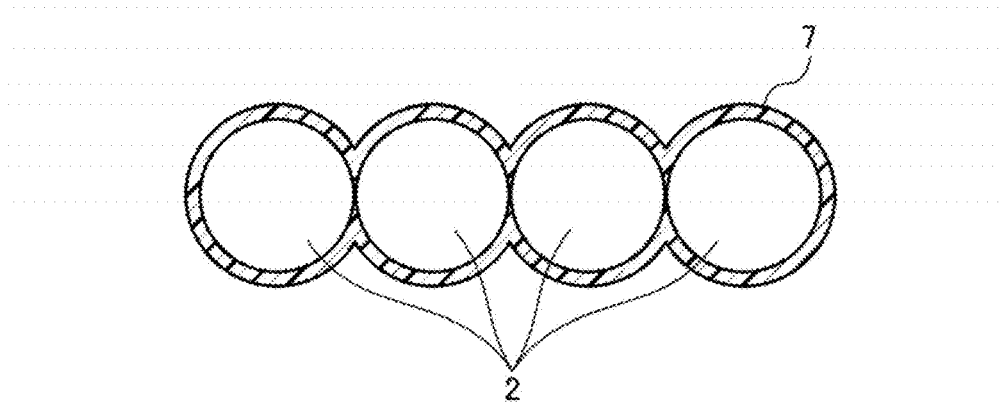

FIG. 6A is a front view illustrating an optical connecting component according to a second embodiment, and FIG. 6B is a cross-sectional view illustrating the optical connecting component according to the second embodiment. The present invention may utilize an optical-fiber ribbon that is formed by integrating a plurality of optical fibers, which are arranged side by side, together with a common coating. In an optical-fiber ribbon 3, a common coating 7 is formed in a depressed manner so as to follow the shapes of the optical fibers 2 and extends in the longitudinal direction (the X direction in FIG. 6A). Note that the common coating 7 corresponds to a ribbon coating of the present invention. The plurality of optical fibers are in a state of the optical-fiber ribbon 3, that is, the optical fibers 2 are integrated with one another, and are connected to the fiber array 10 and the optical connector 20 in a state where the first ends (or the second ends) of the optical fibers 2 are aligned. After the fiber array 10 and the optical connector 20 have been connected to the optical fibers 2, by rubbing the common coating 7 with a specific tool, cracks are generated between the optical fibers 2 by stress that is generated due to friction applied to a surface of the common coating 7, and this enables the optical fibers 2 to be separated from one another.

According to the second embodiment, a plurality of optical fibers can be easily integrated, and optical fibers can be easily separated from one another by friction applied to a surface of the optical fiber ribbon, so that the optical fibers can be flexibly arranged. The optical fibers that are integrated with one another can be easily connected to terminal components, and an optical connecting component including the optical fibers, which are separated from one another, can easily be mounted onto an optical component. In addition, the required dimensional accuracy of the optical connecting component can be reduced, and the optical connecting component that can be easily manufactured can be provided.

The embodiments disclosed herein are examples in all respects, and the present invention is not to be considered limited to the embodiments. The scope of the present invention is to be determined not by the above-described meanings, but by the claims, and it is intended that meanings equal to the claims and all the modifications within the scope of the claims are included in the scope of the present invention.

REFERENCE SIGNS LIST

| 1 optical connecting component, | | 2 optical fiber, |
|---|---|---|
| 2a first end, | 2b second end, | 3 optical-fiber ribbon, |
| 5 UV releasable tape, | 6 attachment surface, | 7 common coating, |
| 10 fiber array, | 11 end surface, | 20 optical connector, |
| 21 end surface, | 30 optical component, | 31, 32 connector |

The invention claimed is:

1. A method of manufacturing an optical connecting component that includes a plurality of optical fibers and a terminal component disposed at ends of the plurality of optical fibers and that is mounted onto an optical component, the method comprising:
a step of arranging the plurality of optical fibers side by side and integrating the plurality of optical fibers together;
a step of connecting end portions of the plurality of optical fibers to the terminal component; and
a step of separating the plurality of optical fibers from one another,
wherein surfaces of the plurality of optical fibers other than the end portions are exposed after the step of separating.

2. The method of manufacturing an optical connecting component according to claim 1,
wherein a glass diameter of each of the optical fibers is $100 \times 10^{-6}$ m or less, and a coating diameter that is an outermost diameter of each of the optical fibers is $240 \times 10^{-6}$ m or more and $260 \times 10^{-6}$ m or less.

3. The method of manufacturing an optical connecting component according to claim 1,
wherein the step of integrating includes attaching a releasable tape that has an adhesive whose adhesive strength deteriorates by being irradiated with ultraviolet light to the plurality of optical fibers.

4. The method of manufacturing an optical connecting component according to claim 1,
wherein the step of integrating includes integrating the plurality of optical fibers together by using a ribbon coating, and
wherein the step of separating includes applying friction to a surface of the ribbon coating such that a crack is generated in the ribbon coating between the optical fibers.

5. A method of manufacturing an optical connecting component that includes a plurality of optical fibers and a terminal component disposed at ends of the plurality of optical fibers and that is configured to be mounted onto an optical component, the method comprising:
a step of connecting end portions of the plurality of optical fibers, the plurality of optical fibers being arranged side by side and integrated together by using a ribbon coating, to the terminal component; and
a step of separating the plurality of optical fibers from one another by applying friction to a surface of the ribbon coating such that a crack is generated in the ribbon coating between the optical fibers.

6. The method of manufacturing an optical connecting component according to claim 2,
wherein the step of integrating includes attaching a releasable tape that has an adhesive whose adhesive strength deteriorates by being irradiated with ultraviolet light to the plurality of optical fibers, and wherein the plurality of optical fibers are not covered with the releasable tape after the step of separating.

\* \* \* \* \*